United States Patent [19]

Mizoguchi et al.

[11] Patent Number: 4,633,352

[45] Date of Patent: Dec. 30, 1986

[54] MAGNETIC FIELD NOISE SHIELD FOR A MAGNETIC HEAD

[75] Inventors: Toshiaki Mizoguchi; Shinichiro Wadaya; Kunihiro Hashimoto; Shinichi Takase, all of Iruma, Japan

[73] Assignee: Ye Data Incorporated, Tokyo, Japan

[21] Appl. No.: 717,485

[22] Filed: Mar. 29, 1985

Related U.S. Application Data

[63] Continuation of Ser. No. 405,152, Aug. 4, 1982, abandoned.

[30] Foreign Application Priority Data

Sep. 17, 1981 [JP] Japan .................................. 56-145589

[51] Int. Cl.⁴ ............................................... G11B 5/48
[52] U.S. Cl. ..................................... 360/104; 360/128
[58] Field of Search ..................... 360/104, 128–129, 360/97–99, 106

[56] References Cited

U.S. PATENT DOCUMENTS

| | | | |
|---|---|---|---|
| 3,432,839 | 3/1969 | Stapper | 360/129 |
| 3,975,771 | 8/1976 | Lazzari | 360/129 X |
| 4,306,258 | 12/1981 | Higashiyama | 360/104 X |
| 4,315,293 | 2/1982 | Winkler | 360/104 X |
| 4,402,025 | 8/1983 | Anderson | 360/104 X |
| 4,425,594 | 1/1984 | Kodjabashev | 360/129 |

Primary Examiner—A. J. Heinz
Attorney, Agent, or Firm—Wenderoth, Lind and Ponack

[57] ABSTRACT

A magnetic head which includes a head piece, a gimbal movably supporting the headpiece and a layer of low electrical resistance metal formed on the surface of the gimbal so as to shield the head piece from relatively high frequency magnetic field noise.

20 Claims, 12 Drawing Figures

FIG. I
(PRIOR ART)
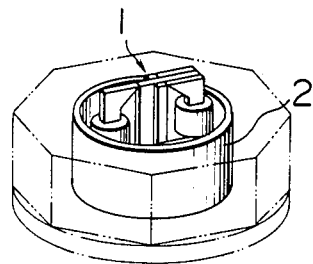
FIG. 2
(PRIOR ART)
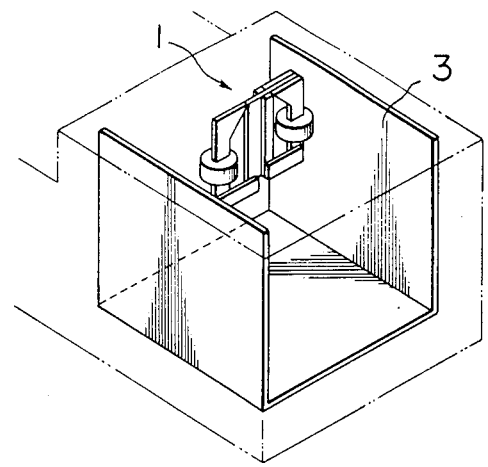
FIG. 3
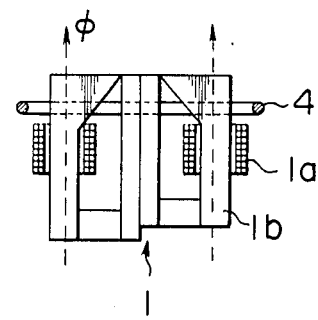

MAGNETIC FIELD NOISE SHIELD FOR A MAGNETIC HEAD

This application is a continuation of application Ser. No. 405,152, filed Aug. 4, 1982, now abandoned.

BACKGROUND OF THE INVENTION

1. Field of the Invention

The present invention relates to a magnetic head in a magnetic read/write device characterized by an arrangement wherein the magnetic head is not susceptible of disturbance from magnetic field.

2. Description of the Prior Art

For convenience of explanation, a description here will be made of an example of a read/write magnetic head of a floppy disc.

In magnetic read/write devices the floppy discs an increase in storage capacity and miniaturization of the device have been particularly required recently.

Processes for increasing the storage capacity considered possible include increasing the recording density of the floppy disc or increasing the track density. In either case, however, difficulties are involved in that the reading output voltage of the magnetic head is low so as to deteriorate the ratio of signal to noise (S/N ratio).

On the other hand, if the miniaturization of devices is further realized in the future, it can be considered that there will be an increased possibility that the distance from the magnetic head to other noise sources, for example, a relay, transformer, reactor CRT, PWB, etc. is small, in which case the S/N ratio is also deteriorated.

It can be said therefore that the increase in storage capacity and the miniaturization of the device will depend on how disturbance from noise components can be decreased.

A magnetic shield is effectively used to prevent the disturbance from magnetic noise applied to the magnetic head.

This magnetic shield, as is well known, can provide a maximum effect by covering the whole surface of an object to be shielded by a ferromagnetic material. However, in case of a magnetic head, it is essentially impossible to cover a surface in contact with a floppy disc. Thus, it is necessary to find a method of providing maximum shielding under the condition that the surface in contact with the floppy disc cannot be covered.

Magnetic shielding methods for the magnetic head heretofore carried out are as shown in FIGS. 1 and 2.

In the case of FIG. 1, a head piece 1 comprising a core and a coil is surrounded by a permalloy ring 2. In the case of FIG. 2, a channel-like permalloy 3 covers a lower portion (the side opposite the surface in contact with the disc) of the head piece 1.

The above-described conventional methods have a disadvantage in that the shield effect with respect to the magnetic field noise of frequencies in excess of several 10 KHz is small. According to actual measurements, the shield effect is approximately 4-6 dB in the low frequency magnetic field and is approximately 1-2 dB in the high frequency magnetic field.

As the result of various experiments and studies, the present inventors have found and provide a method for obtaining a shield effect with respect to the magnetic field noise have a relatively high frequency.

OBJECT

It is a primary object of the present invention to provide a magnetic head in a magnetic read/write device characterized by not being susceptible of disturbance magnetic field.

It is a further object of the present invention to provide a magnetic head which can render the magnetic read/write device smaller in size and recordable with high density and allows the floppy disc to be miniaturized.

BRIEF DESCRIPTION OF THE DRAWINGS

FIGS. 1 and 2 are perspective views of conventional magnetic heads;

FIG. 3 is a front view in longitudinal section showing an embodiment of the present invention;

DESCRIPTION OF THE PREFERRED EMBODIMENTS

Figure 4:
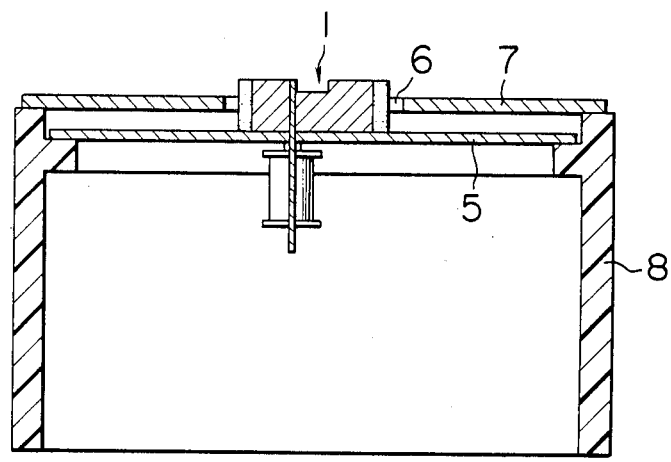
FIG. 4 is an enlarged sectional view of a modified embodiment.

In the following, a few embodiments of the present invention will be described in connection with the drawings.

FIG. 3 shows a basic embodiment, in which a shield effect ring 4 formed of low resistance metal such as copper, aluminum or the like is provided so as to surround a head piece 1. It should be noted that a suitable method is employed to secure the shield effect ring 4 to an apparatus frame.

Assuming that a change in high frequency noise magnetic field occurs, a voltage is induced in a coil 1a and a disturbance noise results. On the other hand, a voltage is likewise induced even in the shield effect ring 4, and thus an electric current flows into the shield effect ring 4, by which current, a magnetic field in a direction of cancelling the disturbance magnetic field is generated to reduce the disturbance noise voltage induced in the coil 1a.

The greater the electric current flowing into the shield effect ring, the greater the shield effect.

The smaller the resistance of the shield effect ring, the greater the electric current flowing into the shield effect ring 4. It is preferable that the specific resistance of the shield effect ring 4 is as small as possible, that the shield effect ring 4 is positioned toward the core piece 1b as close as possible so that the peripheral length (the circumferential length in the illustrated embodiment) of the ring 4 is as short as possible, and that the cross-sectional area is made as large as possible.

In reviewing the conventional magnetic heads from a viewpoint of the aforesaid magnetic shield effect, the magnetic head shown in FIG. 1, to which a cylindrical permalloy shield 2 is applied, has the disadvantages in that the specific resistance of the permalloy is excessively great (about 30 times that of copper) and that the circumferential length of the ring is excessively long since the cylindrical member is located externally of the whole head piece including also the coil. Also, the magnetic head shown in FIG. 2 is low in shield effect since a shield plate is not a shape to surround the head piece and it is also permalloy.

In these magnetic heads shown in FIGS. 1 and 2, even if the cylindrical ring 2 and the shield plate 3 are modified so as to be formed of copper plates, the shield effect with respect to the magnetic field having a frequency in excess of several 10 KHz is merely enhanced by about 1-2 dB which is not a significant improvement.

On the other hand, in the above-described embodiment shown in FIG. 3, if the shield effect ring 4 is formed of copper having a diameter 0.5 mm and the ring is positioned as close to the core 1b as possible, the shield effect is approximately 12 dB in actually measured value, which shows a considerable improvement.

FIG. 4 shows a different embodiment, in which in place of the shield ring, a shield plate 7 formed with the smallest through-hole 6 not hampering the movement of the head piece 1 supported by the gimbal or gimbal spring 5, is mounted on the apparatus frame 8.

If, as a material for the shield plate 7, a low resistance metal plate such as copper or aluminum, etc. is used, and it has a size sufficient with respect to the dimension of the core, a sufficient shield effect (about 20 dB) may be obtained with respect to the high frequency magnetic field noise even if the thickness is dozens of $\mu$m. If the plate is thick, it is also effective with respect to the low frequency magnetic field noise.

In the structure of the conventional gimbal type magnetic head, the construction of the gimbal 5 has a shape similar to the aforesaid shield plate 7. However, it is prerequisite that the gimbal spring is elastic in nature and therefore, a stainless steel or phosphor bronze plate is used, in which case, a sufficient shield effect may not be obtained because the aforementioned materials are large in specific resistance as compared with copper, aluminum etc. and a slit opening in the gimbal spring 5 is large.

Figure 5:
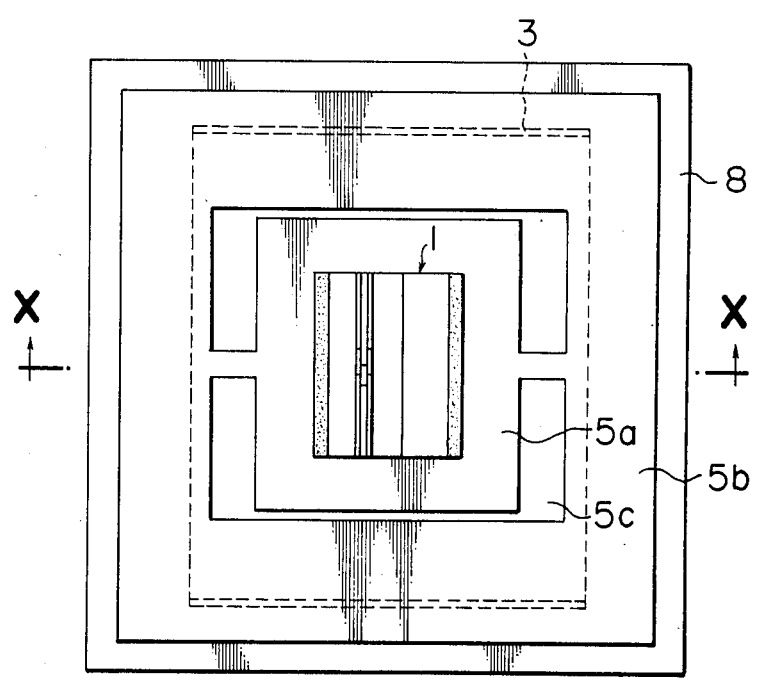
FIG. 5 is a plan view of a further modified embodiment.
Figure 6:
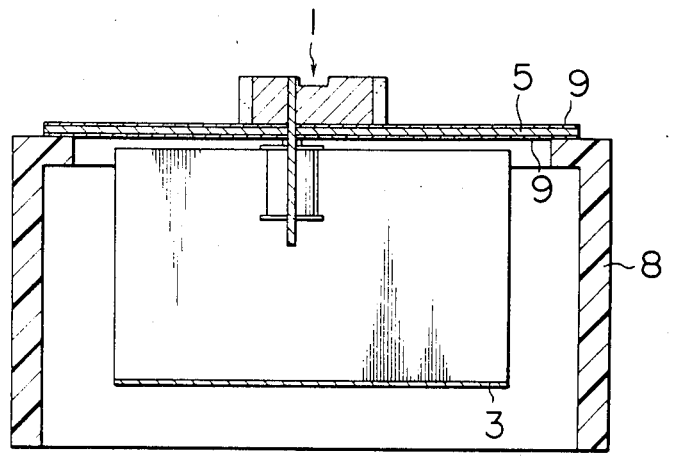
FIG. 6 is a sectional view taken on line X—X of FIG. 5.

FIGS. 5 and 6 illustrate embodiments in which the present invention is applied to a magnetic head of the gimbal type, in which copper 9 is plated or deposited on the upper and lower surfaces of the gimbal spring 5 made of stainless steel. Thus, the layer of copper 9 providing the shielding is coextensive with the surface of the gimbal spring on which it is provided and a portion of the layer directly opposes the head piece 1.

With this arrangement, a swinging portion 5a and a fixed portion 5b are formed with a ring-like layer of shield effect material to thereby restrict the influence resulting from the high frequency disturbance magnetic field noise.

While a pattern of the gimbal spring generally used at present is that the slit opening 5c for forming the swinging portion 5a has a large size as shown, the shield effect may be improved by making said slit smaller.

Figure 7A:
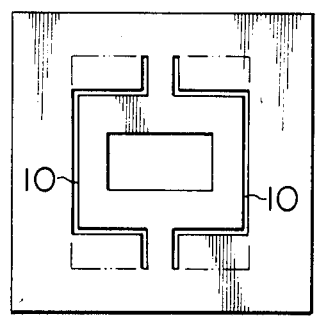
FIGS. 7a and 7b are plan views of various single swinging type gimbals used for the present invention.
Figure 7B:
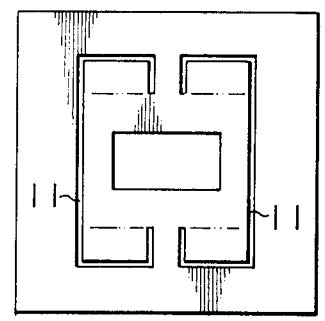

FIGS. 7(a) and 7(b) show how a slit opening of the single swinging type gimbal spring is provided where the slit opening for forming said swinging portion, in which FIG. 7(a) shows the case wherein crank-like slits 10 are provided, and FIG. 7(b) shows the case wherein c-shaped slits 11 are provided. The dash-dotted contour lines denote the contour of the conventional slits.

Figure 8A:
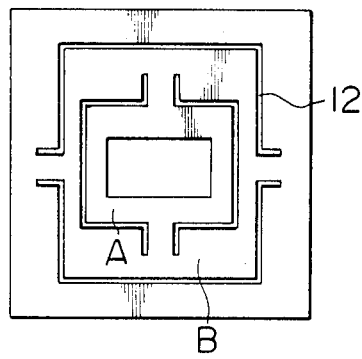
FIGS. 8a thru 8d are plan views of various biaxial swinging type gimbals used for the present invention.
Figure 8B:
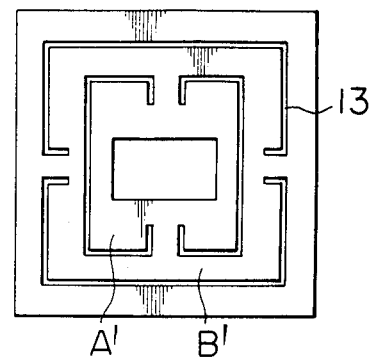
Figure 8C:
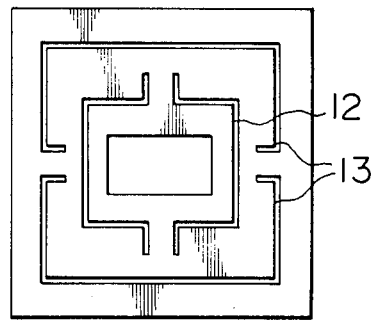
Figure 8D:
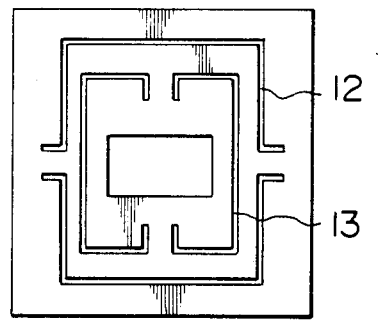

FIGS. 8(a)-8(d) show how a slit opening of the biaxial swinging type gimbal spring is provided, in which FIG. 8(a) shows the case wherein inner and outer swinging portions A and B are formed only be a crank-like slit opening 12, FIG. 8(b) shows the case wherein inner and outer swinging portions A' and B' are formed only by a c-shaped slit opening 13, and FIGS. 8(c) and 8(d) show the case wherein inner and outer swinging portions A" and A''' and B" and B''' are formed by the crank-like slit opening 12 and c-shaped slit opening 13.

In actual magnetic heads, it is suggested that in order to provide the shield effect with respect to the magnetic field noise from a dc magnetic field to a high frequency magnetic field, the conventional shield method (which has its effect principally with respect to the low frequency noise) and the shield effect of the present invention (which has its effect principally with respect to the high frequency noise) may be used jointly.

What is claimed is:
1. A magnetic head, comprising:
   a head piece; and
   a gimbal spring having a first portion, and a second portion elastically movably supported by and connected to said first portion, said head piece being mounted on said second portion so that said head piece is movably directly supported on said second portion, said second portion of said gimbal being formed of a layer of low electrical resistance metal and a material having a resistivity substantially greater than that of said layer of metal, said layer being oriented and positioned sufficiently close to said head piece so as to shield said head piece from magnetic field noise.

2. A magnetic head as in claim 1, wherein a portion of said layer directly opposes said head piece.

3. A magnetic head as in claim 1, wherein said second portion is movably supported by said first portion on opposite sides of said second portion.

4. A magnetic head as in claim 1, wherein said gimbal is formed from an elastic plate having an upper surface and a lower surface opposite said upper surface, said layer being formed on both said upper and said lower surfaces.

5. A magnetic head as in claim 4, wherein said plate has an outer fixed portion having a first outer periphery, a first hinge portion and a swingable inner portion having a center and a second outer periphery, surrounded by said outer portion and connected to said outer portion by said first hinge portion, said inner portion being spaced from said outer portion by a first narrow slit extending all about said second periphery except at said first hinge portion, said head piece being fixed to said inner portion, the dimension of said first narrow slit being small in relation to the dimensions of said inner and outer portions measured in directions from said center toward said first outer periphery.

6. a magnetic head as in claim 5, wherein said inner portion includes an internal portion having a third outer periphery, an external portion surrounding said internal portion, and a second hinge portion hingedly connecting said internal portion to said external portion, said internal and external portions being spaced from each other by a second narrow slit all about said third periphery of said internal portion except at said second hinge portion, said head piece being fixed to said internal portion, the dimension of said second narrow slit being small in relation to the dimensions of said internal and external portions measured in said directions.

7. A magnetic head as in claim 4, wherein said layer completely covers said upper surface and said lower surface.

8. A magnetic head as in claim 1, wherein said first and second portions are formed from an integral plate, having upper and lower surfaces, said layer completely covering at least one of said upper surface and lower surface of said plate.

9. A magnetic head as in claim 1, wherein said second portion comprises a flat plate-shaped member having an upper surface and a lower surface, said layer completely covering at least one of said upper surface and said lower surface.

10. A magnetic head as in claim 1, wherein said low electrical resistance metal consists substantially of one of copper and aluminum.

11. A magnetic head as in claim 1, wherein said gimbal spring is planar.

12. A magnetic head as in claim 1, wherein said head piece is mounted on said second portion so as to allow said head piece to flex relative to a gimbal support mechanism.

13. A magnetic head as in claim 1, wherein said layer is formed on and is coextensive with an outer surface of said second portion on said material.

14. A magnetic head as in claim 1, wherein a portin of said gimbal is formed from an elastic plate having an upper surface and a lower surface opposite said upper surface, said layer being formed on at least one of said upper and lower surfaces.

15. A magnetic head, comprising
a head piece, and
a gimbal spring having a first portion, a second portion elastically supported by and connected to said first portion, said head piece being mounted on said second portion so that said head piece is movably directly supported on said second portion, said second portion of said gimbal being formed of a layer of low electrical resistance metal and a metal material having a resistivity substantially greater than that of said layer of metal, said layer and said metal material being oriented and positioned sufficiently close to said head piece, so as to shield said head piece respectively from first and second ranges of frequency of magnetic field noise, the second range of frequencies being higher than the first range of frequencies.

16. A magnetic head as in claim 15, wherein said metal material consists of steel.

17. A magnetic head as in claim 15, wherein said metal material comprises phosphor bronze.

18. A magnetic head as in claim 15, wherein said gimbal spring is planar.

19. A magnetic head as in claim 15, wherein said head piece is mounted on said second portion so as to allow said head piece to flex relative to a gimbal support mechanism.

20. A magnetic head as in claim 15, wherein said layer is formed on and is coextensive with an outer surface of said second portion on said material.

* * * * *